Figure 1:
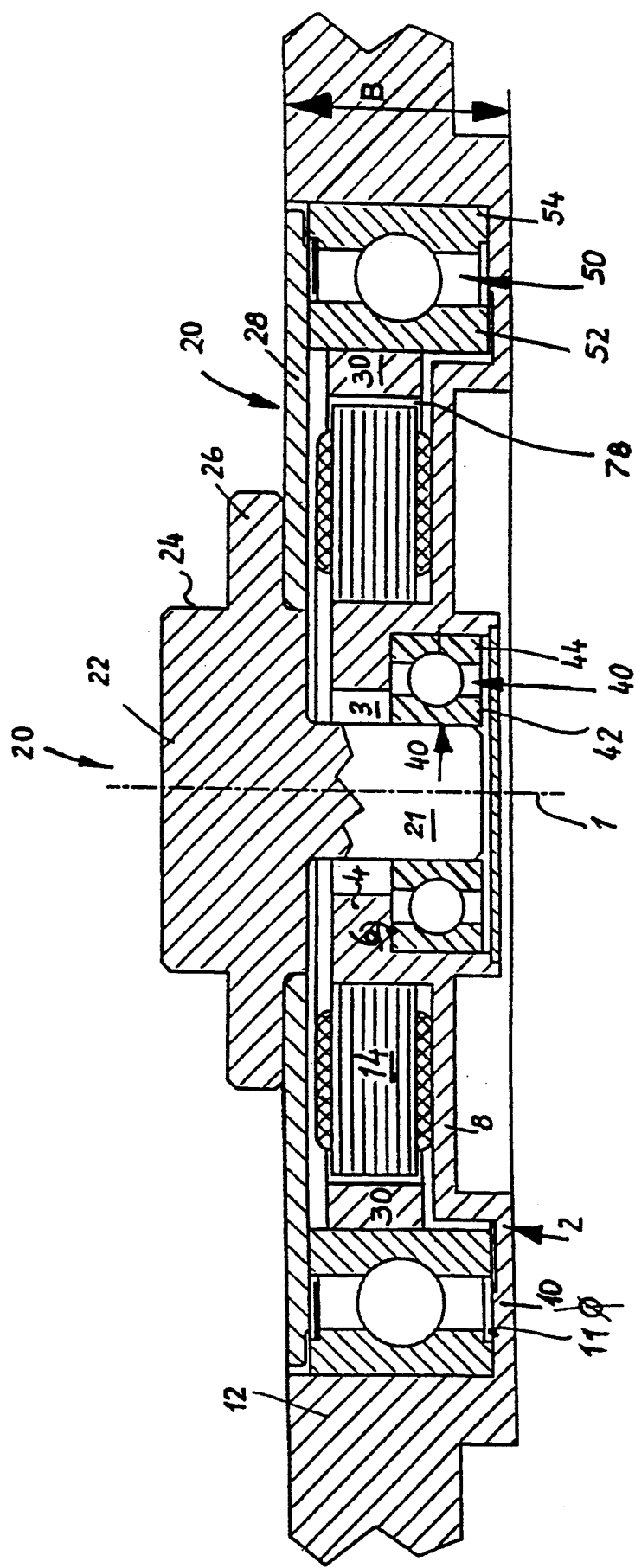

United States Patent [19]
Hans et al.

[11] Patent Number: 5,394,283
[45] Date of Patent: Feb. 28, 1995

[54] DISK STORAGE DRIVE HAVING A ROTOR MOUNTED WITH A PLURALITY OF BEARING

[75] Inventors: Helmut Hans; Jurgen Oelsch, both of St. Georgen, Germany

[73] Assignee: Papst Licensing GmbH, Spaichingen, Germany

[21] Appl. No.: 974,419

[22] Filed: Nov. 12, 1992

[30] Foreign Application Priority Data

Nov. 11, 1991 [DE] Germany .............................. 4136996

[51] Int. Cl.⁶ .................. G11B 17/08; F16C 19/00; H02K 5/16
[52] U.S. Cl. .................. 360/98.07; 360/99.08; 310/90; 384/461
[58] Field of Search ............... 360/97.01, 98.01, 98.07, 360/98.08, 99.08, 99.11, 99.12; 310/90; 384/461

[56] References Cited

U.S. PATENT DOCUMENTS

| | | | |
|---|---|---|---|
| 2,819,127 | 1/1958 | Grobey | 384/461 |
| 2,979,367 | 4/1961 | Mimset | 384/461 |
| 3,547,503 | 12/1970 | Konet | 384/461 |
| 3,645,083 | 2/1972 | Lohring et al. | 57/88 |
| 3,691,542 | 9/1972 | Gabor | 360/99.08 |
| 4,292,656 | 9/1981 | Fujioka | 360/97.02 |
| 4,833,667 | 5/1989 | Castagna et al. | 360/98.07 |
| 4,920,434 | 4/1990 | Brown et al. | 360/106 |
| 5,228,845 | 7/1993 | Steele | 384/461 |

FOREIGN PATENT DOCUMENTS

| | | | |
|---|---|---|---|
| 60-52953 | 3/1985 | Japan | 360/98.07 |
| 2166586 | 5/1986 | United Kingdom | 360/98.08 |

*Primary Examiner*—A. J. Heinz
*Assistant Examiner*—Jefferson Evans
*Attorney, Agent, or Firm*—Fitch, Even, Tabin & Flannery

[57] ABSTRACT

A disk memory drive is presented having a stator and a rotor that is equipped with a centered hub, which hub has a surface onto which one or several hard disks are mountable. The bearing system between rotor and stator comprises two ball-bearings. The first ball-bearing is mounted between the rotor and stator a first distance from a rotational axis, and the second ball-bearing is mounted between the rotor and stator a second distance from the rotational axis, wherein the second distance is greater than the first distance.

17 Claims, 3 Drawing Sheets

DISK STORAGE DRIVE HAVING A ROTOR MOUNTED WITH A PLURALITY OF BEARING

The invention relates to a motor rotor having a centered hub, to an outer surface of which one or several hard disks are mountable, and also which has two ball bearings between the rotor and stator.

Such hard-disk-drives exist in various embodiments, for example with a rotating shaft which is fastened to the hub or with a stationary shaft which is attached to the stator. These serve the purpose of driving one or several storage-disks, which are stacked on the hub using inserted spacer-rings.

In order to guarantee an error-free writing and reading of data by means of provided read/write-heads, such disk-memory-drives have to operate with high precision. Moreover, there is a constant demand for even smaller dimensions.

Common to such known disk-memory-drives is the following: the rotor is mounted by means of two ball bearings, rotatable relative to the stator and the inner races of both of the ball bearings are positioned onto the turning shaft, the outer rings—given said shaft is turning—are positioned to the stator, whereas in the case of a stationary, not moving shaft the outer rings are positioned at the rotor, c.f. e.g. German patent document DE 29 44 212. The bearing-systems of the known memory disk drives thus have the same diameter and are positioned in an axial distance relative to each other. The physical dimension of the motor in the axial direction of the disk drive therefore will have a lower limit, due to the sum of the sizes in the axial direction of both of the ball-bearings. Also, both ball-bearings have to be placed with a clearance separating them, in order to increase the rigidity of the bearing-system.

The invention addresses the task of improving a disk-memory drive of the introductorially mentioned kind in such a way, that a reduction of the axial dimension and an increased rigidity of the bearing system will be realized.

This task is solved according to the invention, regarding a disk-drive of the introductorially mentioned kind, that a first ball-bearing mounts the rotor against the stator, relative to the axis of rotation with a smaller radial distance, and a second ball-bearing mounts the rotor at a greater radial distance.

The advantages of the invention are specifically caused by the fact that both ball-bearings of the bearing system have a different diameter, such that the first ball-bearing mounts the rotor against the stator in an inner region, the second ball-bearing mounts the rotor against the stator in a region closer to the outside. With a pre-load of the bearing-races against each other, which loading is generally in use today, an extended virtual distance of bearings can be realized, according to the invention, and therefore the rigidity of the bearing system can be increased.

The virtual distance of bearings is defined as the distance of points of intersection of the axis of rotation with those lines of interaction which are defined by contacting-points of the balls and their associated lines of movement on the races. A comparatively big virtual distance of bearings will be effected by an alteration of radial extension of both ball-bearings and with appropriate preload of the races against each other, according to the invention. Such could be effected with the known disk-drives only with ball-bearings having a nonzero clearance between both bearings, i.e. such could be realized only with a much larger geometrical extension.

It is preferred to keep the outer diameter of the first, inner ball-bearing smaller than the inner diameter of the second ball-bearing closer to the outside. This embodiment of the invention is characterized by the advantage, that the first ball-bearing may be positioned completely or in part within a cylindrical surface that is defined by the second ball-bearing that is, both ball-bearings may be positioned in an axially overlapping fashion, either in part or completely. A virtual bearing distance, as required to realize a necessary rigidity, may be put in effect by a sufficient radial difference of both ball-bearings and an appropriate pre-load, according to the invention. The height of the drive in axial direction then in essence only will be delimited by the longer one of both ball-bearings. By using an outer, comparatively big second ball-bearing the bearing capability will be increased, and because of the comparatively high number of single balls of the second ball bearing the specifications of operation will be improved, especially the NRRO (nonrepeatable runout).

Additionally, the invention makes it easier to place the centroid of the rotor-mass onto the center point of the virtual distance of the bearings, thus reducing unwanted vibrations. Moreover a beneficial leverage regarding axial play of bearing versus hub is effected.

According to an especially preferred embodiment of the invention the air-gap of the drive-motor is placed between the cylindrical surface of the inner ring of the second ball-bearing and the cylindrical surface of the outer ring of the first ball-bearing. If such an arrangement is provided, the stator winding will be placed radially inside the air-gap, which will find an outside boundary by a permanent magnet of ring shape, which either is placed directly at the cylindrical surface of the inner ring of the second ball-bearing or which will be mounted on a rotor extension mounted in axial direction, which consists of a magnetizable substance and which furnishes a ferromagnetic return path for the magnetic field which emerges from the permanent magnet ring in a radial direction. The second ball-bearing then will have its position at a prescribed small distance from the rotor extension in a direction pointing radially to the outside, with the inner ring of the second ball-bearing being fastened to a radially extending rotor-disc, while the outer ring of the second ball-bearing is mounted onto the stator base or to an outer wall of the stator. Both ball-bearings are positioned with special preference with a prescribed axial displacement, and the first ball-bearing has a smaller axial extension compared to the second, outer ball-bearing. The first ball-bearing has a bigger clearance towards the hub in comparison to the second ball-bearing, the difference amounting to said displacement. Axial extension and the displacement of the first ball-bearing are preferably dimensioned in such way, that the first ball-bearing is placed within a cylindrical volume that is defined by the second ball-bearing. With such an embodiment of the invention the axial extension of the drive-motor will essentially be delimited by the thickness of the stator base, the axial extension of the second ball-bearing an the thickness of the rotor-disk which carries the inner ring of the second ball-bearing and also preferably extends over the outer ring of the second ball-bearing and covers the inner volume of the stator. This embodiment of the invention permits an especially flat kind of construction of the drive-motor requiring only little mounting space of the drive and permits a comparatively extensive virtual distance of bearings.

The stator is preferably furnished with a centered borehole which is limited by a neighboring inner wall. From the inner wall the stator base extends to a direction pointing radially to the outside, which base is preferably recessed in axial direction in order to house the second ball-bearing. In a radial outside direction of the second ball-bearing the stator is furnished with an axial outer wall.

The rotor preferably comprises a central shaft which extends into the central bore of the stator, with the inner ring of the first ball-bearing resting on the shaft, and the outer ring resting on a shoulder of the stator-inner wall. The shaft of the rotor preferably extends as a single part into the hub, which exhibits immediately above the rotor-disk a radially oriented flange of the hub.

Specifics of the claims describe advantageous developments and embodiments of the inventions.

Figure 2:
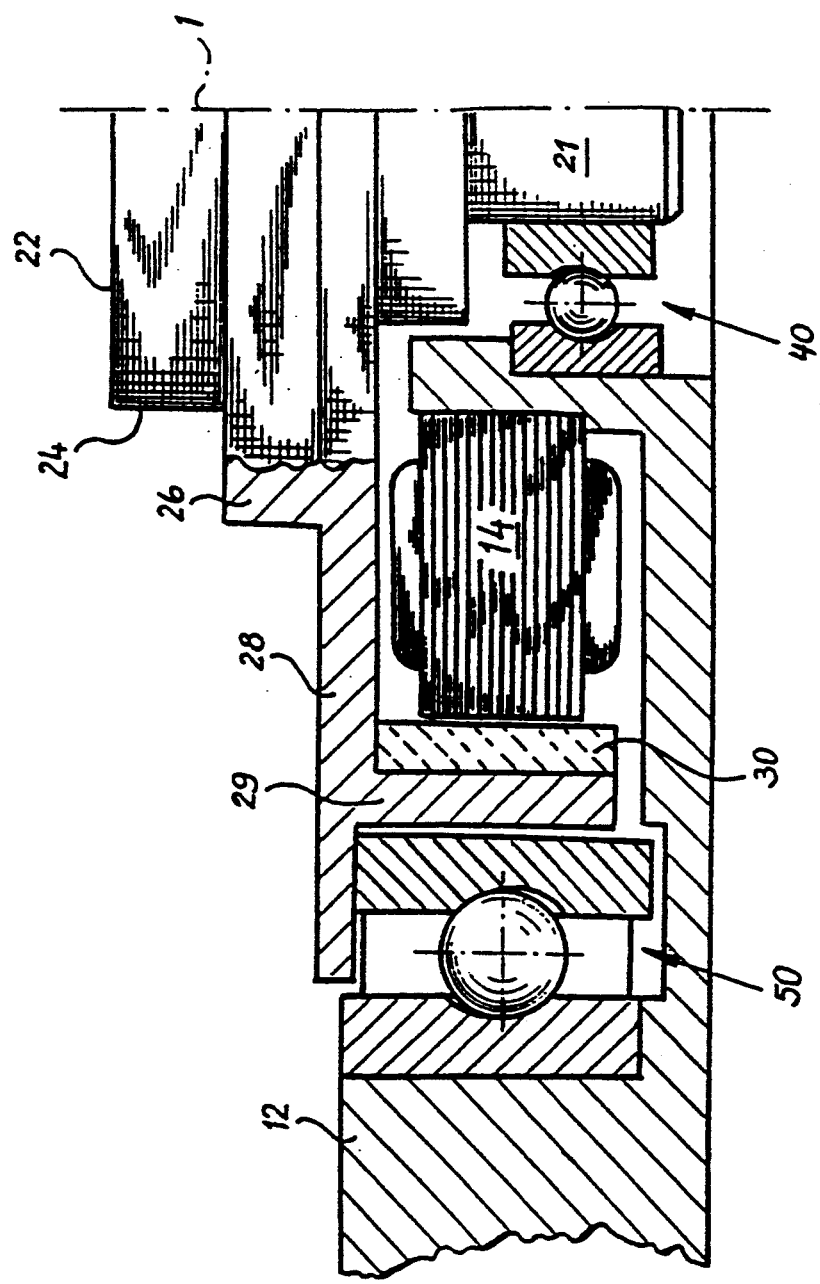

Embodiments of the invention will be further clarified by means of the drawings, shown by:

FIG. 1 a cross-section of a first embodiment of the disk-memory drive;

FIG. 2 a cross-section of a second embodiment of the disk-memory-drive; and

Figure 3:
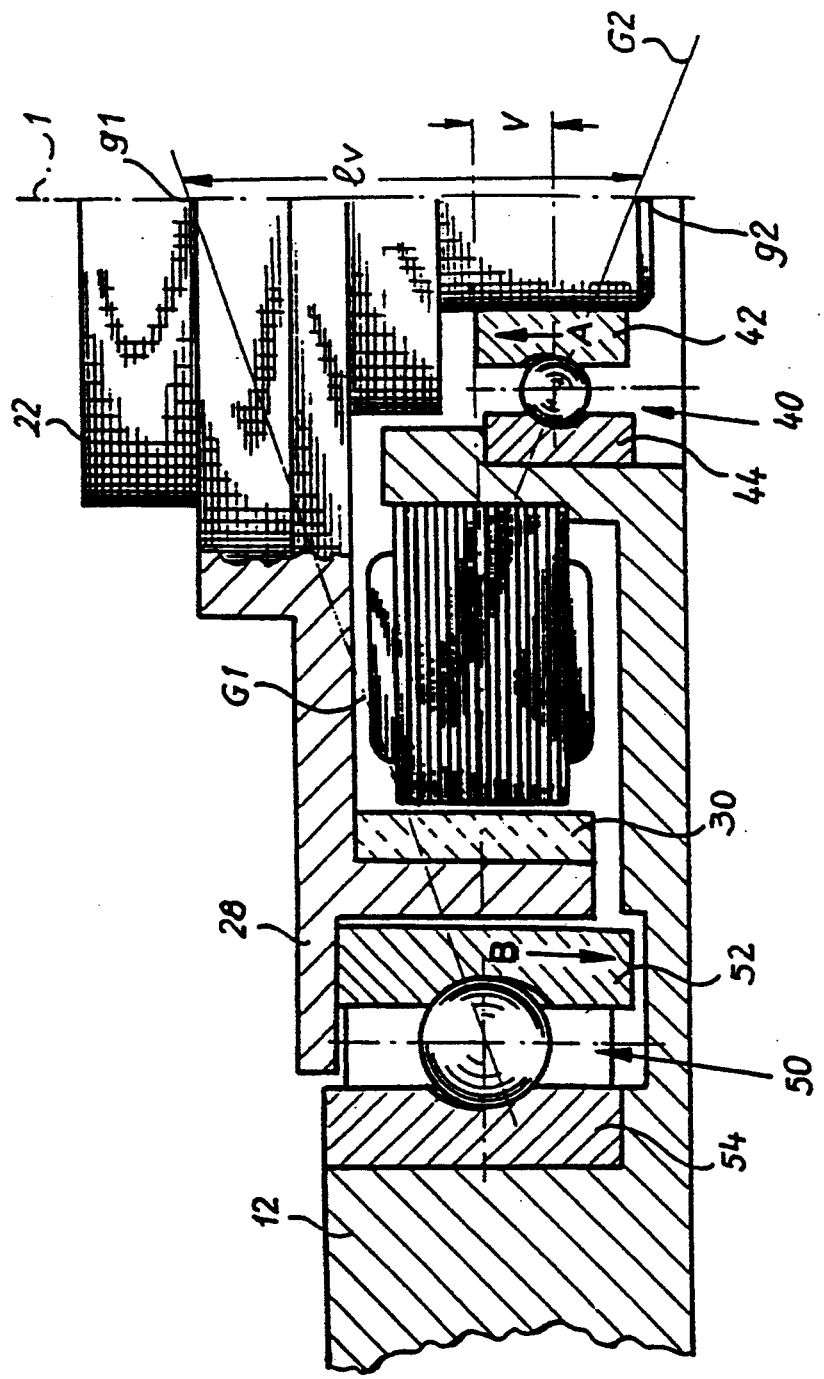

FIG. 3 a drawing corresponding to FIG. 2, into which the virtual distance of bearings is drawn.

FIGS. 1 and 2 show a cross section through a disk-memory drive which comprises a stator 2, and a rotor 20 with a centered hub 22. Hub 22 is provided with a radially oriented hub-rim 26, which serves to carry a first rigid disk (memory disk), which will be centered to the outer surface 24 of the hub. By means of interspaced spacer-rings (not shown) it is possible to mount several rigid disks onto the hub, with prescribed distance.

Rotor 20 (of embodiments according to FIGS. 1 and 2) incorporates a central shaft 21, which extends as a single part into hub 22. A rotor disk 28 is fastened to the bottom side of the hub-rim 26, which disk extends radially to an outer wall 12 of the stator. Stator 2 is provided with a center bore 3, which is delimited by an inner wall 4 of ring shape. From the inner wall 4 a floor part 8 extends in a direction pointing radially outside, which in order to increase the motor-volume comprises a recessed ring shaped volume 10 at the outer side, which is delimited by an axially extending outer wall 12 which is ring-shaped.

Between rotor 20 and stator 2 there is a bearing system consisting of a first ball-bearing 40 and a second ball-bearing 50. The first ball-bearing 40 mounts the rotor in a comparatively small distance of rotor-axis 1 against stator 2, and the second ball-bearing 40 mounts the rotor 20 against the stator 2 in a comparatively larger distance off the axis of rotation 1.

In the embodiments as shown, the inner ring 42 of the first ball-bearing 40 is mounted onto shaft 21, and the outer ring 44 of the first ball-bearing 40 is mounted onto a shoulder 6 of a neighboring inner wall 4 of the stator 2, which wall is ring shaped. Shoulder 6 delimits the outer ring 44 in an axial direction. Inner ring 52 of the second ball-bearing 50 is fastened at a radially outer side of rotor disk 28, and outer ring 54 of the second ball-bearing 50 is placed onto a lower shoulder 11 of the recessed ring-section 10 of the stator base 8, immediately in front of the outer wall 12 of stator 2.

The embodiment according to FIG. 1 shows a permanent magnet ring 30 which is attached to the cylindrical inner surface of inner ring 52 of the second ball-bearing 50, which ring, via an axial airgap 18, interacts with the magnetic field of stator windings 14, which are arranged around inner wall 4 of stator 2.

The embodiment according to FIG. 2 is different from the embodiment according to FIG. 1 inasmuch, as permanent magnet 30 of ring shape of FIG. 2 on the inner surface of an axial rotor-extension 29, which creates a magnetic return path for radially emerging magnetic fields of permanent magnet ring 30. At a small radial distance outside the rotor-extension 29, the inner ring 52 of the second ball-bearing 40 is fastened to the rotor disk 28.

In the embodiments as shown, the bearing system which consists of both ball-bearings 40 and 50 is characterized as follows: The outer diameter of the first ball-bearing 40 is smaller than the inner diameter of the second ball-bearing. Stator windings 14 and ringshaped permanent magnet 30 form a cylindrical air gap 18, which is positioned between the cylindrical surface of the inner ring of the second ball-bearing 50 and the cylindrical surface of the outer ring of the first ball-bearing 40. Both ball-bearings 40, 50 are offset with an axial displacement "V", c.f. especially FIG. 3, wherein the first ball-bearing 40 has an axial distance relative to hub 22 which is greater by the amount of displacement V in comparison to the second ball-bearing 50. The thickness of the first ball-bearing 40 is less than the thickness of the second ball-bearing 50.

In the embodiments as shown in FIGS. 1 and 2 the axial displacement V of the first ball-bearing is adjusted regarding the axial extensions of both ball-bearings 40, 50 such that the first ball-bearing 40 is placed within a cylindrical volume defined by the second ball-bearing 50. The physical extension in axial extension of the second ball-bearing 50 therefore defines—concurrent with the thickness of stator base 8, 10 and the thickness of rotordisk 28—the axial extension B of the drive motor.

In an embodiment according to FIG. 1 the rotor-disk 28 extends in a radial direction over inner ring and over the outer ring 54 of the second ball-bearing 50 and has its end at a small distance from the outer wall 12 of the stator. In the embodiment according to FIG. 2 however the rotor disk 28, which may form the hub as a single part, is drawn in radial direction only over the inner ring 52 of the second ball-bearing 50, and has its end separated in radial direction from the outer ring 54 of the second ball-bearing 50.

FIG. 3 shows an illustration comparable to FIG. 2, where the axial displacement V between both ball-bearings 40, 50 is indicated. In addition, by arrows A and B the mechanical preload that is introduced into the bearing system during its assembly is marked. In order to effect such preload the inner ring 42 of the first ball-bearing 40 will be put under tension against the outer ring 44 in axial direction towards hub 22, and then be affixed to the shaft, compare for arrow A. The inner ring 52 of the second bearing 40 receives a preload of opposite direction, arrow B, and will be affixed when carrying this preload. A line G1, which intersects the points of contact of the balls on their running tracks (of the accordingly preloaded second ball-bearing 50), establishes in combination with axis of rotation 1 an intersection g1. A comparative line G2 which intersects the points of contact of the balls on their running tracks of first ball-bearing 40, in combination with axis of rotation 1, establishes an intersection g2.

The distance between intersecting points g1 and g2 is called virtual distance of bearings $l_v$. This virtual distance of bearings $l_v$ represents a measure for the rigidity of the bearing system. Because of the axial offset V of both bearings 40, 50 and because of their difference in radial extension the virtual distance of bearings $l_v$, and therewith the rigidity of the bearing system is especially large, furthermore the size of the drive-motor in axial direction is especially small.

What is claimed is:

1. Disk-memory-drive having a stator, a rotor with a centered hub, and one or more hard disks being attachable to the outer surface of the hub, and with two bearings between the rotor and stator mounting the rotor for rotation about an axis of rotation characterized in that, the first bearing mounts the rotor at a first radial distance from the axis of rotation and the second bearing mounts the rotor at a second radial distance from said axis, said second radial distance being greater than said first radial distance, and said first bearing being disposed at least partially within a cylindrical surface defined by said second bearing.

2. Disk-memory-drive according to claim 1, characterized in that, the two bearings are ball-bearings.

3. Disk-memory-drive according to claim 2, characterized in that the two ball-bearings exhibit an offset "V" in the axial direction.

4. Disk-memory drive according to claim 3, characterized in that the first ball-bearing is farther from the hub in an axial direction than the second ball-bearing, resulting in an offset "V" in comparison to the second ball-bearing.

5. Disk-memory drive according to claim 1 or 2, the rotor comprising a ring-shaped permanent magnet, which surrounds the stator windings with an airgap therebetween, characterized in that, the airgap is situated between the cylindrical surface of the inner ring of the second ball-bearing and the cylindrical surface of the outer ring of the first ball-bearing.

6. Disk-memory drive according to claim 1 or 2, characterized in that, the rotor (20) comprises a central shaft which protrudes into a central bore of the stator, and that an inner ring of the first bearing is attached to the shaft, and an outer ring is attached to a shoulder of a neighboring inner wall of the stator.

7. Disk-memory drive according to claim 1 or 2, characterized in that, an inner ring of the second bearing is fastened radially outside to a rotor disk which is fastened to the hub, and that an outer ring of the second bearing is attached to a stator base at a radially outwards oriented side.

8. Disk-memory drive according to claim 1 or 2, characterized in that, an inner ring of the first bearing has a preload which is directed in an axial direction to the hub, whereas an inner ring of the second bearing has a preload directed in an axially opposite direction.

9. Disk-memory drive according to claim 1 or 2, characterized in that, the first bearing exhibits a smaller axial extension compared to the second bearing.

10. Disk-memory drive according to claim 1 or 2, characterized in that, the rotor comprises a ring shaped permanent magnet which is positioned at the cylindrical surface of the inner ring of the second bearing.

11. Disk-memory drive according to claim 1 or 2, characterized in that, a permanent magnet of ring shape is fastened to an inner cylindrical surface of an axial rotor-extension and that an inner ring of the second bearing is positioned at a distance off the outer cylindrical surface of the axially extending rotor extension at the rotor.

12. Disk-memory drive according to claim 1 or 2, characterized in that, a shaft extends into the hub forming a single part, and the hub is provided with a radially extending hub-rim at a predefined distance off its free end, with a rotor disk being affixed to the underside of said rim.

13. Disk-memory drive according to claim 12, characterized in that, the rotor disk extends in a radial direction over an outer ring of the second bearing.

14. Disk-memory drive according to claim 1 or 2, characterized in that, the stator comprises a ring shaped inner wall, which delimits the center bore; a base which extends in a radial direction from the inner wall to the outer side, on which base an outer ring of the second bearing is attached, and furthermore comprises a ring shaped outer side wall, which is directly contiguous to the cylindrical surface of the outer ring.

15. Disk-memory drive according to claim 14, characterized in that, the ring shaped outer wall of the stator extends in an axial direction over the outer ring of the second bearing unto the surface of rotor disk that faces the hub.

16. Disk-memory drive according to claim 1 or 2, characterized in that a stator winding is placed on a stator base neighboring the inner wall of the stator.

17. Disk-memory drive according to claim 1 or 2, characterized in that, the axial extension of the drive motor is defined by the thickness of a stator base, the axial extension of the second bearing and the thickness of the rotor disk.

* * * * *